Nov. 5, 1935.　　　D. R. STOCKS　　　2,020,164
HEADLIGHT FOR MOTOR CARS
Filed March 21, 1932
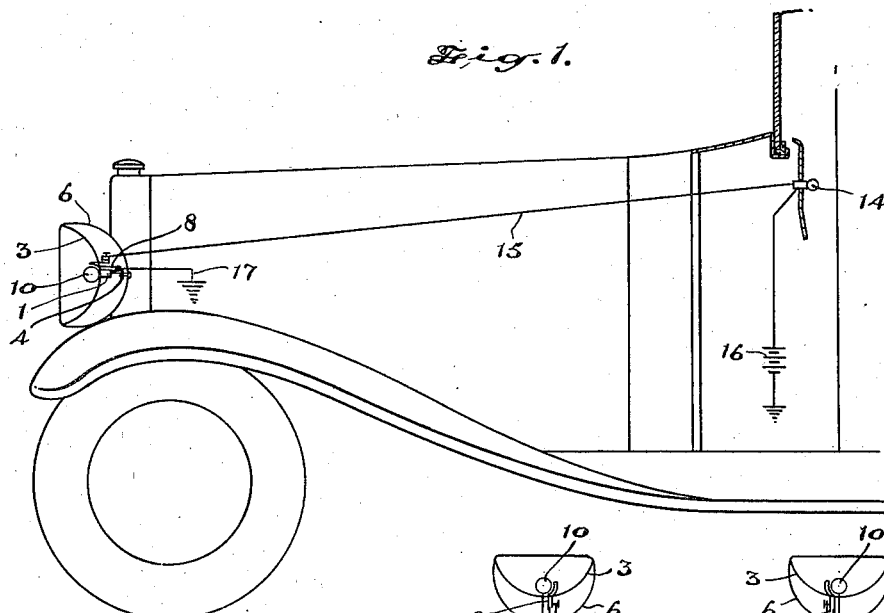
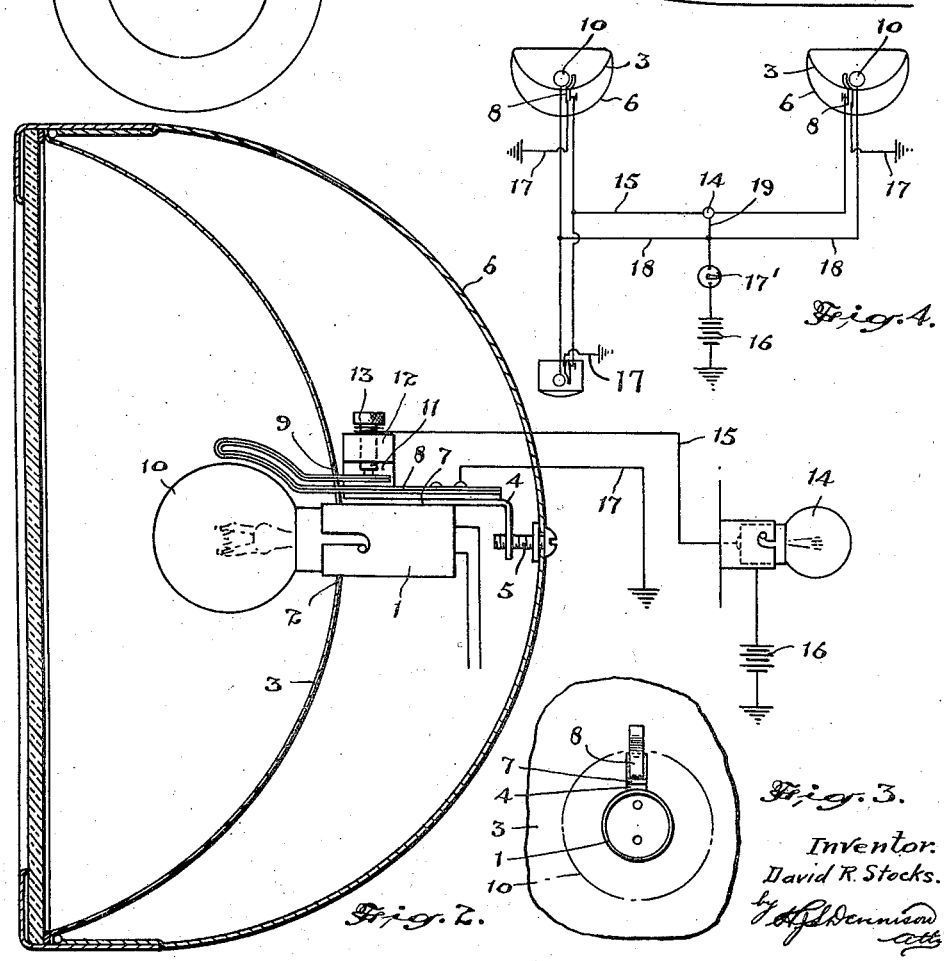
Inventor.
David R. Stocks.

Patented Nov. 5, 1935

2,020,164

UNITED STATES PATENT OFFICE 2,020,164

HEADLIGHT FOR MOTOR CARS

David R. Stocks, Toronto, Ontario, Canada

Application March 21, 1932, Serial No. 600,200

2 Claims. (Cl. 177—311)

The principal objects of this invention are to minimize danger incident to night driving attending the failure of one of the head lamps or the tail light and to provide means for this purpose which will acquaint the driver immediately of the failure of any one of the lights depended upon for the safety of the operation of the vehicle.

A further object is to provide a means for this purpose which will be dependable in its operation, of low cost and which will not entail any extensive alterations in the present equipment.

The principal feature of the invention consists in the novel arrangement of a plurality of thermostat switch members each disposed in influential relation to an incandescent lamp to be influenced by the heat emanating from such incandescent lamp and each capable of closing a circuit through an indicating device upon the failure of its respective lamp.

In the drawing, Figure 1 is a somewhat diagrammatic part sectional view of the forward part of a car illustrating the application of the present invention thereto.

Figure 2 is a vertical mid-sectional view through an automobile headlamp showing the relation of the incandescent lamp and thermostatic switch element when the lamp is not operating and showing an indicating lamp controlled by the thermostat.

Figure 3 is a fragmentary view of the reflector showing the relation of the thermostatic member thereto and with the incandescent lamp removed and indicated in dotted lines.

Figure 4 is a diagrammatic view of an installation carried out in accordance with this invention in which both the lamp circuits and thermostatic control circuits are controlled from a common switch.

Many very serious accidents have been occasioned on the highway as the result of the operation of a car or vehicle with one of the lights out and in the majority of cases the driver of the offending vehicle was not aware that one of his lights had failed.

Various devices have been proposed in an attempt to alleviate this serious condition attending night driving with various degrees of success. Such devices were usually in the nature of an attachment to be secured to the forward lamps only to cast a reflective beam rearwardly when the lights were burning properly. Such devices however, were objectionable and became broken off or lost and moreover presented an ungainly appearance to the otherwise smooth continuity of the headlamp. The present invention has been devised with a view to eliminating these objectionable conditions and to devise a means of indicating very positively when one or more of the incandescent lamps have failed.

Referring particularly to the form of the invention illustrated in the drawing, the usual socket 1 is provided which is preferably of the adjustable type and which extends through a central opening 2 in the reflector 3 and said socket carries a rearwardly extending bracket 4 having threaded engagement with the adjusting screw 5 which is accessible through the rear wall of the casing 6 of the headlamp.

A metal bracket 7 is secured to the bracket 4 and a bi-metallic thermostatic member 8 is suitably secured at its rearward end to the bracket 7. The thermostatic member 8 extends forwardly through an opening 9 in the reflector and it is then preferably curved upwardly and forwardly to conform partly to the curvature of the incandescent lamp 10, the free portion being then given a return bend which may conform to the curvature of the lamp-adjacent portion as shown and the end extremity preferably extends back through the opening 9 in the reflector and terminates a desired distance therebeyond.

The metal bracket 7 is formed with an upstanding side flange 11 which carries a block of insulating material 12 placed above the free rearward end of the thermostat member.

An adjustable contact 13 is threaded downwardly in the insulating block 12 and its lower end is adapted to co-operate with the free inward end of the thermostat member. Thus when the incandescent lamp 10 is lighted the heat emanating therefrom will be absorbed by the closely adjacent curved portion of the thermostatic member and the thermostatic member is adapted on becoming heated by such emanating heat rays to move at its free inward end downwardly away from contact with the adjustable contact 13 so that contact at this point will be broken.

A suitable indicating lamp 14 which in the case of an automobile installation, will be located on the dash of the car as indicated, as here shown with one of its contacts connected with the contact screw 13 by the lead 15, the other terminal of the lamp 14 being energized from a battery 16.

The thermostatic member itself is shown as grounded by the lead 17. Thus, or if for any reason, the incandescent lamp 10 should fail either by a defective circuit or by the lamps burning out, as is often experienced while driving along the highway, the lamp will thus fail to emit heat rays so that the particular thermostat associated therewith will cool down and its free inward end will move in the direction of the contact screw 13 and will make contact therewith, closing the circuits through the lamp 14 and thus give an indication to the driver of the vehicle that one of the headlight lamps or tail light has failed.

In the diagrammatic showing Figure 4, the numeral 17' indicates the usual light control switch of a motor car having leads 18 extending therefrom for conducting current to the headlamps and tail light. A lead 19 connects these wires with the indicating lamp 14 as shown so that upon failure of any one of the incandescent lamps, the circuit will be established from the usual car battery through the indicating lamp to indicate the failure. Thus when the switch 17' is in "off" position as in daylight driving or when the car is not in use, the thermostatic control circuit will not be energized and the indicating lamp will not be burning unnecessarily.

When the lamps of the motor car are not burning all of the thermostatic switch elements are in their closed position. Thus the instant the lights are turned on, circuit is established through the indicating lamp 14 which will commence to burn giving a true indication that the said indicating lamp is in functioning condition. The said indicating lamp will continue to burn for a short period until all of the thermostatic members have been sufficiently heated by emanation of the rays from the different incandescent lamps to cause the same to move away from their respective contacts whereupon the indicating lamp 14 will go out indicating that all the lamps are in proper functioning condition.

While I have described this invention as applying particularly to motor vehicles for operation on highways, it will of course be understood that the invention is not limited to use in this connection. It will be understood that various structural arrangements may be resorted to without departing from the essential spirit of the invention which is to utilize the heat emanating from an incandescent lamp to control a thermostatic switch member by direct influential operation therefrom for the purpose of controlling an indicating device which indicates the functioning or non-functioning of the said incandescent lamp.

I have shown the thermostatic member as secured directly to the bracket member on which it is mounted in metal-to-metal contact, but it will be understood that it may be desirable in certain cases to interpose a heat insulating strip between the thermostatic member and the bracket.

I have also shown the thermostatic member as closely parallelling the bracket member 7 to a point adjacent where it extends through the opening 8 of the reflector. In this way the bracket member acts as a stop to position the thermostatic member preventing its coming into contact with the lamp to damage same.

In cases where the thermostatic member is secured in direct metal-to-metal contact with the bracket 7, it will be seen that direct heat conduction will be experienced through the base of the lamp and socket to the bracket and to the thermostatic member which may be found valuable in the carrying out of the invention.

The arrangement of the device is such as to be readily accommodated in the ordinary space between the reflector and the casing, and as shown in Figure 3, only a very small opening is required to be made in the reflector and the appearance of the light is not marred in any manner.

The invention is not limited to use in connection with an adjustable socket, but has been described in connection therewith by way of example and when used in conjunction with an adjustable socket, it will be seen that a co-operative relation of the lamp and socket and thermostatic members will be retained at all times irrespective of the adjustment of the socket.

What I claim as my invention is:—

1. In a headlight for motor cars, the combination with the casing having a reflector mounted therein and spaced from the rear of the casing, of a lamp socket adjustably mounted between said reflector and casing having an incandescent electric lamp therein, said reflector having a small opening therein adjacent the socket, and a thermostatic switch member secured to said socket rearwardly of the reflector so as not to obstruct rays from the reflector and lamp and having a slender bi-metallic portion extending forwardly through said small reflector opening and disposed adjacent said incandescent lamp to be influenced by heat emanating therefrom, said thermostatic element socket and lamp being adjustable as a unit without disturbing their relative relation.

2. A headlight for motor cars, the combination of a reflector and a socket mounted rearwardly thereof and projectable therethrough, and incandescent lamp mounted in said socket at the forward side of the reflector, a bracket secured to said socket having a slender looped bi-metallic thermostatic strip secured at one end thereto rearwardly of said reflector and extending through the latter and over said incandescent lamp, and an adjustable contact carried by said bracket rearwardly of said reflector and disengaged or engaged by the other end of said looped bi-metallic member respectively in accordance with whether said incandescent lamp is burning or not, the slender nature of the bimetallic element and the mounting of same and its contacts rearwardly of the reflector obviating objectionable impairment of the efficiency of the reflector and lamp.

DAVID R. STOCKS.